US012269618B2

(12) United States Patent
Smith et al.

(10) Patent No.: US 12,269,618 B2
(45) Date of Patent: *Apr. 8, 2025

(54) MODEL PREDICTIVE CONTROL FOR SPACECRAFT FORMATION

(71) Applicant: Utah State University Space Dynamics Laboratory, North Logan, UT (US)

(72) Inventors: Tyson Smith, Logan, UT (US); John Akagi, Logan, UT (US); Greg Droge, Nibley, UT (US)

(73) Assignee: Utah State University Space Dynamics Laboratory, North Logan, UT (US)

( * ) Notice: Subject to any disclaimer, the term of this patent is extended or adjusted under 35 U.S.C. 154(b) by 278 days.

This patent is subject to a terminal disclaimer.

(21) Appl. No.: 17/891,968

(22) Filed: Aug. 19, 2022

(65) Prior Publication Data

US 2023/0286674 A1  Sep. 14, 2023

Related U.S. Application Data

(63) Continuation-in-part of application No. 17/689,038, filed on Mar. 8, 2022, now Pat. No. 12,129,051.

(51) Int. Cl.
*B64G 1/24* (2006.01)
(52) U.S. Cl.
CPC .................................... *B64G 1/242* (2013.01)

(58) Field of Classification Search
CPC ...... B64G 1/242; B64G 1/2422; B64G 1/247; B64G 1/646
See application file for complete search history.

(56) References Cited

U.S. PATENT DOCUMENTS

| | | | |
|---|---|---|---|
| 2017/0247123 A1* | 8/2017 | Turner | B64G 1/1007 |
| 2018/0233054 A1* | 8/2018 | Woon | G08G 5/0056 |
| 2019/0049999 A1* | 2/2019 | Weiss | B64G 1/26 |
| 2020/0055617 A1* | 2/2020 | Grover | G06F 17/13 |
| 2022/0063842 A1* | 3/2022 | Weiss | B64G 1/368 |
| 2022/0363415 A1* | 11/2022 | Conn | B64G 1/242 |

OTHER PUBLICATIONS

Augenstein et al., "Optimal Scheduling of a Constellation of Earth-Imaging Satellites, for Maximal Data Throughput and Efficient Human Management", Proceedings of the Twenty-Sixth International Conference on Automated Planning and Scheduling, vol. 26, Association for the Advancement of Artificial Intelligence, 2016, pp. 1-8.

(Continued)

*Primary Examiner* — Wade Miles
*Assistant Examiner* — Mohammed Yousef Abuelhawa

(57) ABSTRACT

For model predictive control for a spacecraft formation, a method calculates a virtual point that represents a plurality of spacecraft orbiting in a spacecraft formation. The method calculates an outer polytope boundary and an inner polytope boundary relative to the virtual point for a given spacecraft of the plurality of spacecraft. The method maneuvers the given spacecraft to within the inner polytope boundary using model predictive control (MPC) to minimize fuel consumption.

20 Claims, 17 Drawing Sheets

(56) References Cited

OTHER PUBLICATIONS

H.Shang et al., "Design and optimization of low-thrust orbital phasing maneuver", Aerospace Science adn Technology No. 42, Feb. 7, 2015, pp. 365-375.

M. Pontani et al., "Nonlinear Earth orbit control using low-thrust propulsion", Acta Astronautica, No. 179, Oct. 21, 2020, pp. 296-310.

"Notice of Allowance and Fees Due", United States Patent and Trademark Office, Aug. 2, 2024, pp. 1-9.

* cited by examiner

201

| Spacecraft State 203 |
|---|
| Distance Threshold 205 |
| Outer Polytope Boundary 207 |
| Inner Polytope Boundary 209 |
| Matrix Constraint 211 |
| First Objective Function 213a |
| Second Objective Function 213b |
| Third Objective Function 213c |
| Maneuver Strategy 215 |
| Velocity Change 217 |
| Model Predictive Controller 219 |
| Orbital Data 221 |
| Switching Strategy 223 |
| Drift Horizon 225 |
| ROE Data 227 |
| Drift State 241 |

| ROE Maximum Bounds |
| 229 |
| ROE Minimum Bounds |
| 231 |
| ROE State |
| 233 |
| LVLH State |
| 235 |
| ROE Space |
| 237 |
| LVLH Space |
| 239 |

FIG. 2D

MODEL PREDICTIVE CONTROL FOR SPACECRAFT FORMATION

CROSS-REFERENCE TO RELATED APPLICATIONS

This application is a continuation-in-part of and claims priority to U.S. patent application Ser. No. 17/689,038 entitled "MODEL PREDICTIVE CONTROL FOR SPACECRAFT FORMATION" and filed on Mar. 8, 2022, for Tyson Smith, which is incorporated herein by reference.

FIELD

The subject matter disclosed herein relates to model predictive control (MPC) and more particularly relates to MPC for a spacecraft formation.

BACKGROUND

Description of the Related Art

Spacecraft maneuver within a spacecraft formation to achieve a mission objective.

BRIEF SUMMARY

A method for model predictive control for a spacecraft formation is disclosed. The method calculates a virtual point that represents a plurality of spacecraft orbiting in a spacecraft formation. The method calculates an outer polytope boundary and an inner polytope boundary relative to the virtual point for a given spacecraft of the plurality of spacecraft. The method maneuvers the given spacecraft to within the inner polytope boundary using model predictive control (MPC) to minimize fuel consumption. An apparatus and computer program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a schematic block diagram illustrating one embodiment of spacecraft data;

FIG. 2D is a schematic block diagram illustrating one embodiment of Relative Orbital Elements (ROE) data;

DETAILED DESCRIPTION

Figure 1A:
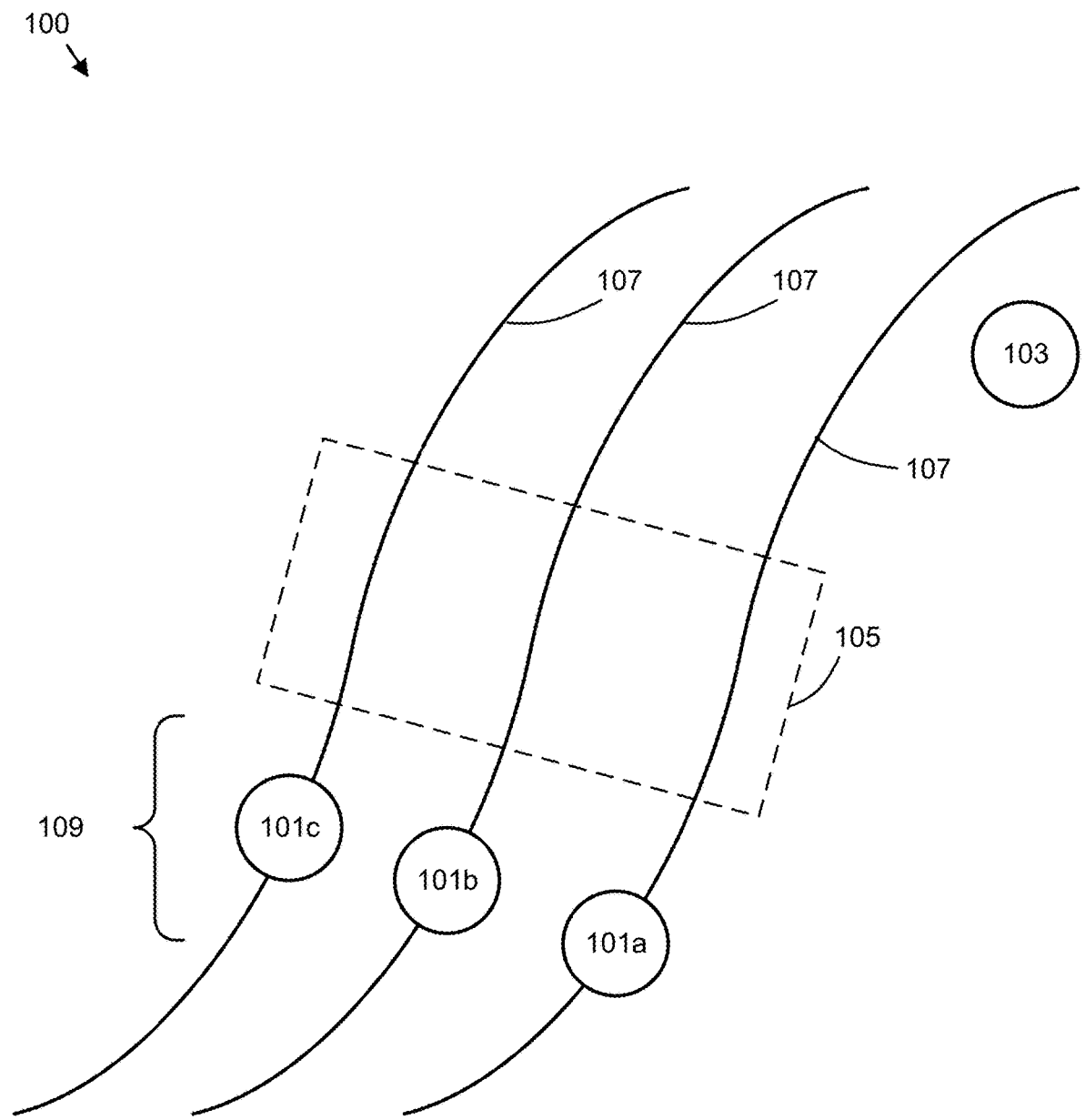
FIG. 1A is a schematic diagram illustrating one embodiment of a spacecraft constellation.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object-oriented programming language such as Python, Ruby, R, Java, Java Script, Smalltalk, C++, C sharp, Lisp, Clojure, PHP, MATLAB, or the like and conventional procedural programming languages, such as the "C" programming language or similar programming languages. The computer readable code may execute entirely on a spacecraft or ground station computer, partly on the spacecraft or ground station computer, as a stand-alone software package, partly on the spacecraft computer and partly on a ground station computer or entirely on the ground station remote computer or server. In the latter scenario, the remote computer may be connected to the spacecraft computer through any type of network.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

The description of elements in each figure may refer to elements of proceeding figures. Like numbers refer to like elements in all figures, including alternate embodiments of like elements.

FIG. 1A is a schematic diagram illustrating one embodiment of a spacecraft constellation 100. In the depicted embodiment, a plurality of spacecraft 101 are shown traversing orbital tracks 107. The spacecraft 101 may be orbiting in a spacecraft formation 109 to perform a mission objective such as capturing data in a target area 105. Capturing data may include but is not limited to gravitational mapping, capturing images, capturing sensor data, making measurements, communicating with ground stations 103 on the ground, communicating with another spacecraft 101, and the like.

A spacecraft 101 may need to maneuver to avoid debris or perform a mission objective. Maneuvers are complicated by a need to maintain formation. In addition, maneuvers are constrained by a need to reduce fuel consumption. Unfortunately, both communication bandwidth to the spacecraft 101 and/or on spacecraft computing resources may be limited. As a result, the spacecraft 101 may need to calculate maneuvers with restricted computing resources. In addition, a ground station 103 may need to calculate maneuvers for many spacecraft 101 concurrently.

The embodiments described herein employ model predictive control (MPC) with polytope boundaries to maintain the trajectories of a formation. The embodiments simplify the calculations so that a spacecraft 101 may perform the calculations autonomously. In addition, the embodiments speed the calculations for maneuvers at the ground station 103. As a result, the efficiency of a computer controlling the spacecraft 101 is improved.

Figure 1B:
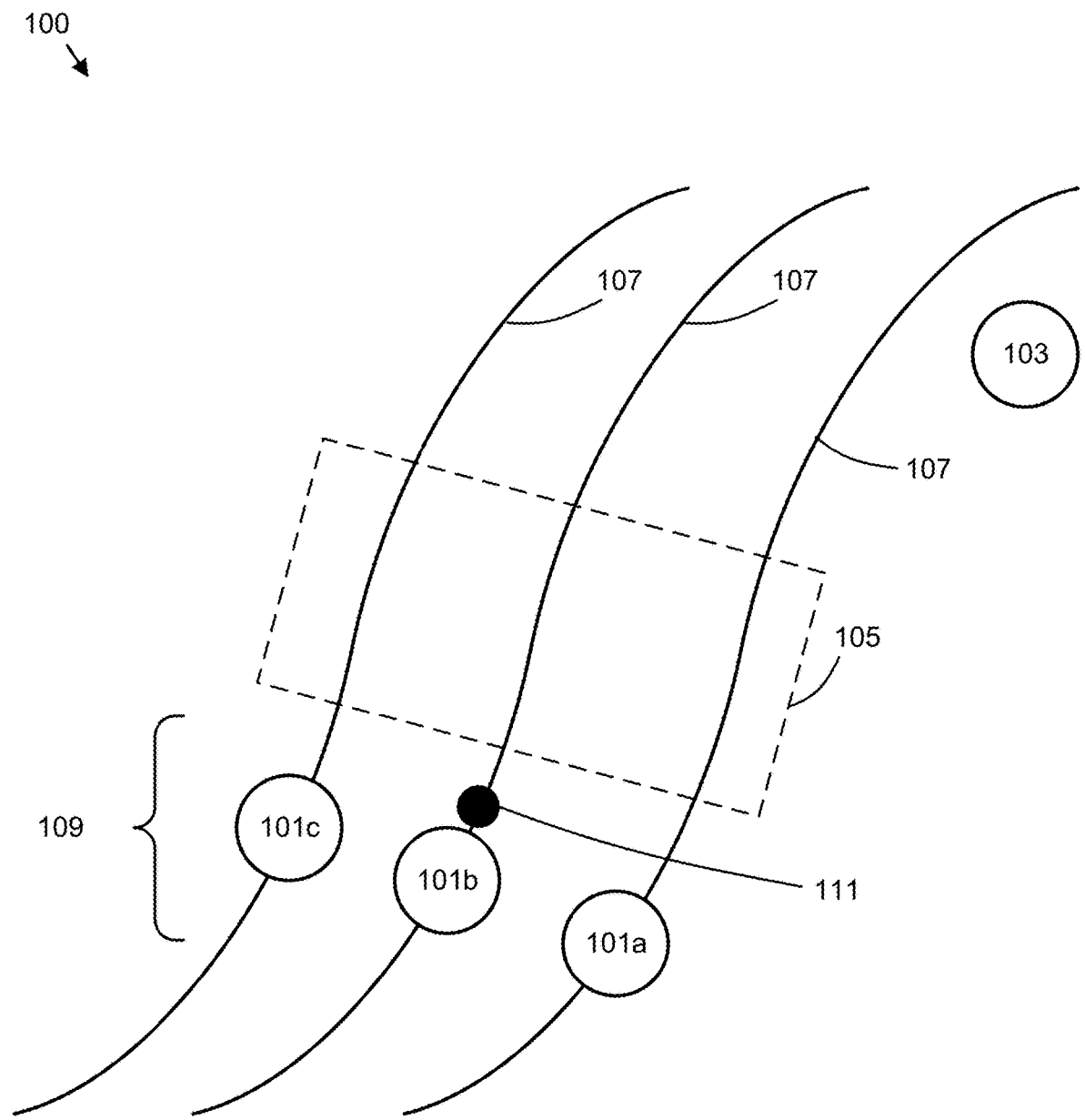
FIG. 1B is a schematic diagram illustrating one alternate embodiment of a spacecraft constellation.

FIG. 1B is a schematic diagram illustrating one alternate embodiment of the spacecraft constellation 100. In the depicted embodiment, a virtual point 111 is shown for the spacecraft formation 109. The virtual point 111 may be used to design a reference orbit for each spacecraft 101 in the spacecraft formation 109. There is no physical spacecraft 101 associated with the virtual point 111. The virtual point 109 represents a fictitious spacecraft 101 where motion is propagated through time according to a standard nonlinear motion model. From the virtual point 111, relative orbital tracks 107 may be generated that define the nominal locations of each of the spacecraft 101 within the spacecraft formation 109. The virtual point 111 may represent the spacecraft formation 109 to each spacecraft 101, simplifying control calculations. In the depicted embodiment, the virtual point 111 leads the spacecraft formation 109.

Figure 1C:
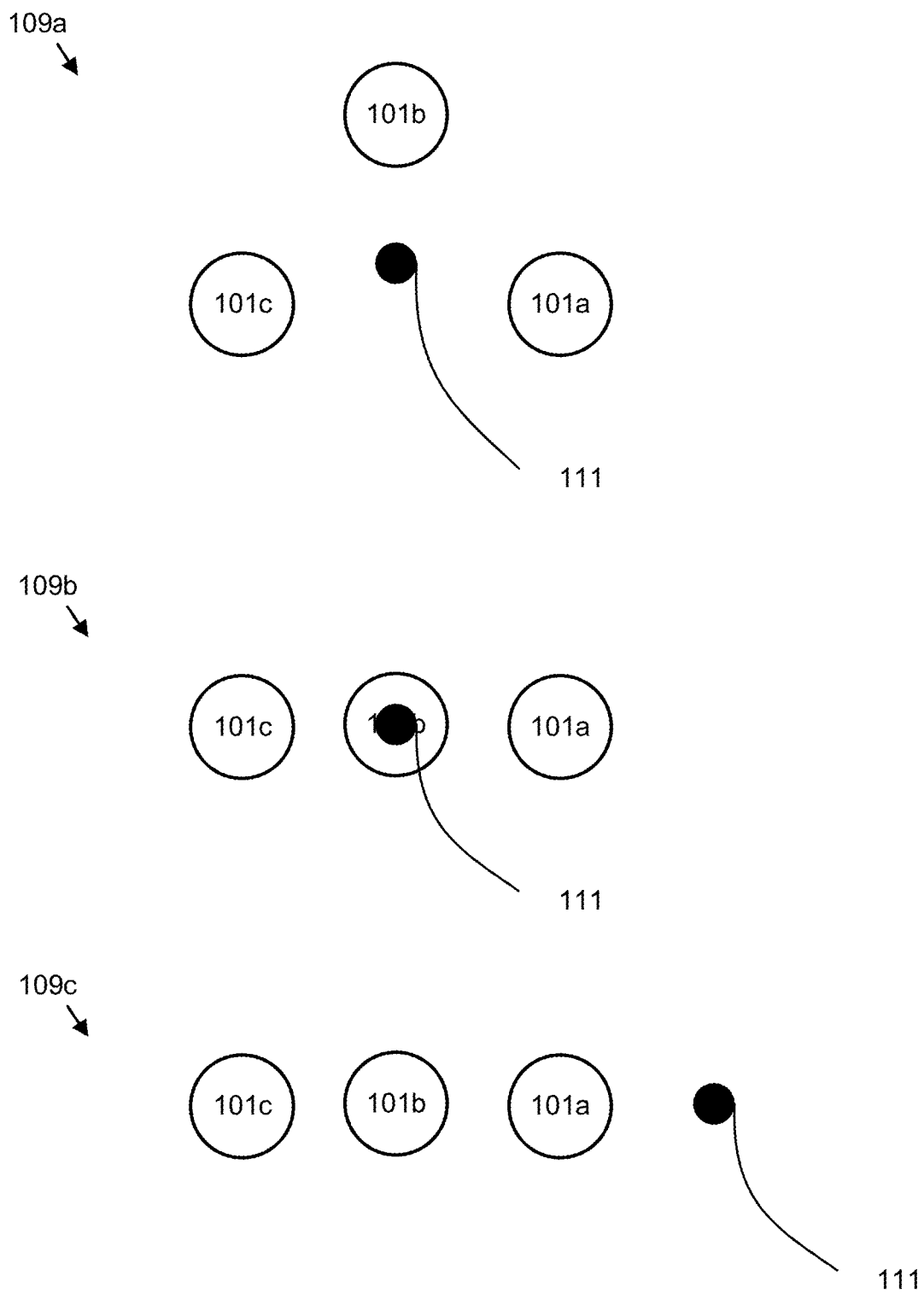
FIG. 1C is a schematic diagram illustrating one embodiment of virtual points.

FIG. 1C is a schematic diagram illustrating one embodiment of virtual points 111 in spacecraft formations 109a-c. The virtual point 111 may be at a center of a spacecraft formation 109 as shown for spacecraft formations 109a/b. The virtual point 111 may be offset from the center including outside the spacecraft formation 109 as shown in spacecraft formation 109c.

Figure 2A:
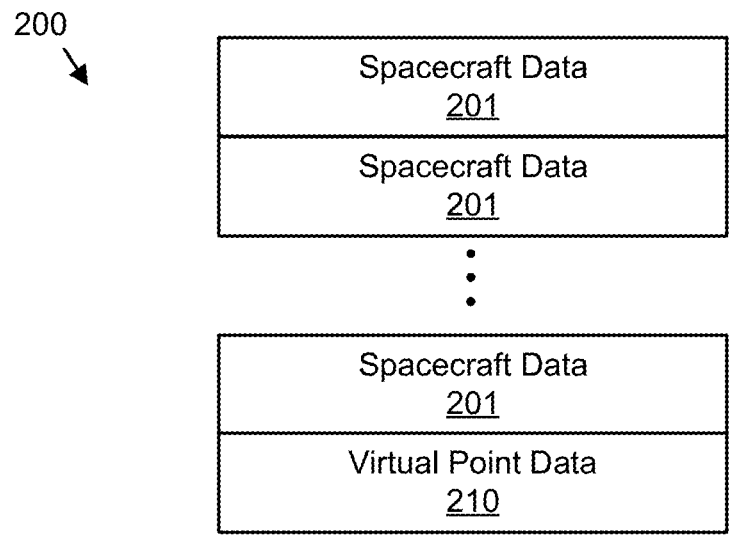
FIG. 2A is a schematic block diagram illustrating one embodiment of formation data.

FIG. 2A is a schematic block diagram illustrating one embodiment of formation data 200. The formation data 200 describes the orbital track 107 of the spacecraft 101 in the spacecraft formation 109. The formation data 200 may be organized as a data structure in a memory. The formation data 200 includes spacecraft data 201 for each spacecraft 101 in the spacecraft formation 109. The spacecraft data 201 is described in more detail in FIG. 2C. In addition, the formation data 200 includes virtual data 210 that describes the orbital track 107 of the virtual point 111.

Figure 2B:
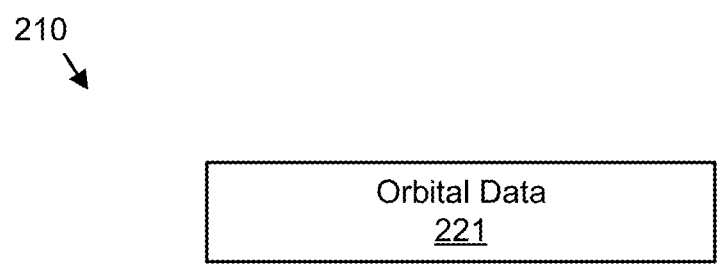
FIG. 2B is a schematic block diagram illustrating one embodiment of virtual point data.

FIG. 2B is a schematic block diagram illustrating one embodiment of the virtual point data 210. In the depicted embodiment, the virtual point data 210 includes orbital data 221. The orbital data 221 may be expressed as Relative Orbital Elements (ROE) and/or Local Vertical Local Horizontal (LVLH) data.

In one embodiment, the orbital data 221 is described using Hill-Chohessey-Whiltshire (HCW) equations as shown in Equation 1. The HCW equations linearize the two-body gravitational dynamic equations about a near circular orbit and can be stated as $$\ddot{x} - 3n_c^2 x - 2n_c \dot{y} = u_x$$

$$\ddot{y} + 2n_c \dot{x} = u_y$$

$$\ddot{z} + n_c^2 z = u_z \tag{1}$$

where x, y, and z represent the relative position of the spacecraft 101 in Cartesian coordinates in the Local Vertical, Local Horizontal (LVLH) frame; $\dot{x}$, $\dot{y}$, and $\dot{z}$ represent the relative velocities; $\ddot{x}$, $\ddot{y}$, and $\ddot{z}$ represent the relative accelerations; and $n_c$ is the mean motion, or average angular velocity, of the orbital data 221. The LVLH frame may be defined such that x is the radial direction, z is along the angular momentum vector, and y satisfies the right-hand rule.

If the spacecraft state of the virtual point 111 or spacecraft 101 is defined as x=[x y z $\dot{x}$ $\dot{y}$ $\dot{z}$]T and the control as $u=[u_x u_y u_z]^T$, Equation 1 can be written in the state space form as shown in Equation 2.

$$x = Ax + Bu \quad (2)$$
where
$$A = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 3n_c^2 & 0 & 0 & 0 & 2n_c & 0 \\ 0 & 0 & 0 & -2n_c & 0 & 0 \\ 0 & 0 & -n_c^2 & 0 & 0 & 0 \end{bmatrix} B = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad (3)$$

If A and B are held constant over some timestep Δt, an exact discrete solution can be found as shown in Equation 4.

$$x_{k+1} = A_D x_k + B_D u_k, \; A_D = e^{A\Delta t}, \; B_D = (\int_0^{\Delta t} e^{A(\Delta t - \tau)} d\tau) B \quad (4)$$

The resulting discretized HCW matrices are shown in Equations 5 and 6.

$$A_D = \begin{bmatrix} 4 - 3\cos n_c \Delta t & 0 & 0 & \frac{1}{n_c}\sin n_c \Delta t & \frac{2}{n}(1 - \cos n_c \Delta t) & 0 \\ 6(\sin n_c \Delta t - n_c \Delta t) & 1 & 0 & \frac{2}{n}(\cos n_c \Delta t - 1) & \frac{1}{n}(4\sin n_c \Delta t - 3n_c \Delta t) & 0 \\ 0 & 0 & \cos n_c \Delta t & 0 & 0 & \frac{1}{n_c}\sin n_c \Delta t \\ 3n_c \sin n_c \Delta t & 0 & 0 & \cos n_c \Delta t & 2\sin n_c \Delta t & 0 \\ 6n_c(\cos n_c \Delta t - 1) & 0 & 0 & -2\sin n_c \Delta t & 4\cos n_c \Delta t - 3 & 0 \\ 0 & 0 & -n_c \sin n_c \Delta t & 0 & 0 & \cos n_c \Delta t \end{bmatrix} \quad (5)$$

$$B_D = \begin{bmatrix} \frac{2}{n_c^2}\sin^2\frac{n_c \Delta t}{2} & -\frac{2}{n_c^2}(\sin n_c \Delta t - n_c \Delta t) & 0 \\ \frac{2}{n_c^2}(\sin n_c \Delta t - n_c \Delta t) & -\frac{1}{2n_c^2}\left(8\cos n_c \Delta t + 3n_c^2 \Delta t^2 - 8\right) & 0 \\ 0 & 0 & \frac{2}{n_c^2}\sin^2\frac{n_c \Delta t}{2} \\ \frac{1}{n_c}\sin n_c \Delta t & -\frac{1}{n_c}(2\cos n_c \Delta t - 2) & 0 \\ -\frac{4}{n_c}\sin^2\frac{n_c \Delta t}{2} & \frac{4}{n_c}\sin n_c \Delta t - 3\Delta t & 0 \\ 0 & 0 & \frac{1}{n_c}\sin n_c \Delta t \end{bmatrix} \quad (6)$$

In one embodiment, $A_D$ matches the discrete transition matrix in Equation 2 while $B_D$ is derived using Equations 3 and 4. In one embodiment, the orbit δα is defined using orbital elements in Equations 7 and 8, where a is a semimajor axis, e is an eccentricity vector of $e_x$ and $e_y$, i is an inclination vector of $i_x$ and $i_y$, Ω is a right ascension of ascending node, ω is an argument of perigee, a mean argument of latitude f, mean anomaly M, and c and d subscripts indicate the elements of the chief or reference and deputy or spacecraft orbital paths 107. When the eccentricity and inclination vectors e and i are parallel to each other, the spacecraft 101 does not pass through the relative orbital plane in front of the virtual point 111. In contrast, if the inclination vectors e and i are orthogonal, the spacecraft 101 does pass through the orbital plane in the along track direction raising the risk of collision. The ROE state of the spacecraft 101 is nonsingular for circular orbits ($e_c=0$), whereas it is still singular for strictly equatorial orbits ($i_c=0$).

$$\delta \alpha = \begin{bmatrix} \delta a \\ \delta \lambda \\ \delta e_x \\ \delta e_y \\ \delta i_x \\ \delta i_y \end{bmatrix} = \begin{bmatrix} (a_d - a_c)/a_c \\ (f_d - f_c) + (\Omega_d - \Omega)\cos i_c \\ e_{x,d} - e_{x,c} \\ e_{y,d} - e_{y,c} \\ i_d - i_c \\ (\Omega_d - \Omega_c)\sin i_c \end{bmatrix} \quad (7)$$

where $$\begin{bmatrix} a \\ f \\ e_x \\ e_y \\ i \\ \Omega \end{bmatrix} = \begin{bmatrix} a \\ \omega + M \\ e\cos\omega \\ e\sin\omega \\ i \\ \Omega \end{bmatrix} \quad (8)$$

FIG. 2C is a schematic block diagram illustrating one embodiment of the spacecraft data 201. In the depicted embodiment, the spacecraft data 201 includes the spacecraft state 203, a distance threshold 205, an outer polytope boundary 207, an inner polytope boundary 209, a matrix constraint 211, at least one objective function 213, a maneuver strategy 215, a velocity change 217, the MPC 219, the orbital data 221 for the spacecraft 101, a switching strategy 223, a drift horizon 225, ROE data 227, and a drift state 241.

The distance threshold 205 may specify a maximum distance that a given spacecraft 101 may move within the spacecraft formation 109 relative to the virtual point 111. The distance threshold 205 may be a constant. Alternatively, the distance threshold 205 may be dynamically calculated. The distance threshold 205 may be a vector. The drift state 241 may characterize drift.

The MPC 219 is used to find the most fuel-efficient strategy to perform an in-space maneuver for the spacecraft 101. The basis for these dynamic optimization problems is a dynamic model that describes how the spacecraft state x(k) 203 changes with time, assuming an initial condition x(0), that is affected by the control input u(k) as shown in Equation 9.

$$x(k+1) = g(x(k), u(k)), \; x(0) = x_0, \quad (9)$$

where g(x,u) generally represents a nonlinear function. The goal of the optimal control procedure is to find the vector of inputs $U_N=[u(0)^T, \ldots, u(N-1)^T]^T$ such that the objective function is optimized over the time horizon N. The MPC 219 may be solved as shown in Equation 10.

$$\min_{U_N} \Sigma_{k=0}^{N-1} q(x_k, u_k) + p(x_N) \quad (10)$$

$$\text{s. t. } x_{k+1} = g(x(k), u(k)), x(0) = x_0 \; k = 1, 2, , N$$

$$u_k \in U, x_k \in X \quad\quad k = 0, 1, 2, , N-1$$

The terms $q(x, u)$ and $p(x)$ represent the stage cost and the terminal cost, respectively. Stage cost is the transitory cost along the maneuver. Terminal cost is a cost for the final maneuver. In the past, two problems often occurred when using an optimal control solution in practice. First, even with optimization algorithms taking advantage of linearities and convexities, a horizon time that is sufficiently large enough to produce desirable convergence characteristics may prove computationally prohibitive. Second, the model of the spacecraft 101 is usually inaccurate and the spacecraft 101 may be impacted by external disturbances that can cause it to diverge from the predicted path. For this reason, in the embodiments, the spacecraft state 203 may be measured at a future time period and the optimal control problem is resolved, where the measured spacecraft state x(1) 203 is considered the new initial condition. This process is embodied in the MPC 219.

Since the linearized model dynamics may not match the true dynamics or account for perturbations, the first control found $u_0$ is applied to the spacecraft 101 and response is measured. This new state x(1) can then be considered a new initial condition and the MPC 219 can be run again to find an updated control scheme. This allows for the system to react and correct perturbations without perfect knowledge of the spacecraft system. Another advantage of MPC 219 is that constraints can be added to bound the spacecraft states 203 or control inputs which is not possible with other feedback controllers such as linear quadratic control. Finally, the MPC 219 time horizon allows it to preemptively act to stay within the bounds rather than simply react which can allow for more judicious control usage.

The MPC 219 provides the ability to express constraints, which is not common in many feedback control solutions. Furthermore, weights in the objective functions 213 can provide intuitive "control knobs" for tuning to the desired behavior.

Common objective functions 213 for linear systems include the $L_2$, $L_1$, and $L_\infty$ norms as they can result in quadratic and linear programs. Given an initial spacecraft state of $x_0$ 203, and a time horizon of N intervals, the $L_2$, or quadratic, objective function 213b can be written as shown in Equation 11 subject to Equation 12.

$$J(x, u) = \frac{1}{2}u_0^T R u_0 + \frac{1}{2}\Sigma_{k=1}^{N-1}\left[x_k^T Q x_k + u_k^T R u_k\right] + \frac{1}{2}x_N^T P x_N \quad (11)$$

$$x_{k+1} = A x_k + B u_k \quad (12)$$

where R, Q, and P are the weightings on control usage, state error, and terminal error, respectively. For a linear system, the spacecraft dynamics become $x_{k+1}=Ax_k+Bu_k$. The $L_1$ and $L_\infty$ objective functions 213 are shown in Equations 13 and 14 respectively.

$$J_1 = \Sigma_{k=1}^{N-1}|Qx_k|_1 + \Sigma_{k=0}^{N-1}|Ru_k|_1 + |Px_N|_1 \quad (13)$$

$$J_\infty = \Sigma_{k=1}^{N-1}|Qx_k|_\infty + \Sigma_{k=0}^{N-1}|Ru_k|_\infty + |Px_N|_\infty. \quad (14)$$

Velocity change ($\Delta V$) 217 may be used as the metric to compare the fuel savings of the different norms. The three different object function norms 213 may be compared in terms of requisite computation time and total velocity change $\Delta V$ 217.

To maintain a given spacecraft formation 109, the outer polytope boundary 207, the inner polytope boundary 209, and the drift horizon 225 are defined to force the spacecraft 101 to stay within a keep-in-boundary. This allows the spacecraft 101 to drift while also maintaining the given spacecraft 101 in the required position within the spacecraft formation 109. At each timestep k the outer polytope boundary 207 and the inner polytope boundary 209 are defined by a convex polytope consisting of a plurality faces where the position elements of the desired spacecraft state $x_{d,k}$ 203 of the spacecraft 101 exist within the polytope volume. The use of a convex polytope allows for a high degree of freedom in the possible constraints and for the formulation of the problem as a linear program. Each of the polytope faces are defined by a point p and a normal vector $\hat{\eta}$ that is assumed to point towards the interior of the outer polytope boundary 207 and/or the inner polytope boundary 209. Let r be any arbitrary point. If r is on the boarder or interior of the outer polytope boundary 207 and/or the inner polytope boundary 209 then the dot product will satisfy Equation 15.

$$\hat{\eta} \cdot (r-p) \geq 0 \text{ or, equivalently, } -\hat{\eta}^T r \leq -\hat{\eta}^T p. \quad (15)$$

The matrix constraint 211 may be used to force the spacecraft state $x_k$, 203 consisting of three position and three velocity elements, to be within the outer polytope boundary 207 and/or the inner polytope boundary 209 defined at time k. This is formulated as Equation 16 and 17.

$$A_{poly,k} x_k \leq b_{poly,k} \quad (16)$$

where $$A_{poly,k} = \begin{bmatrix} -\hat{\eta}_{1,k}^T & 0_{1\times 3} \\ -\hat{\eta}_{2,k}^T & 0_{1\times 3} \\ \vdots & \vdots \\ -\hat{\eta}_{M,k}^T & 0_{1\times 3} \end{bmatrix} b_{poly,k} = \begin{bmatrix} -\hat{\eta}_{1,k}^T p_{1,k} \\ -\hat{\eta}_{2,k}^T p_{2,k} \\ \vdots \\ -\hat{\eta}_{M,k}^T p_{M,k} \end{bmatrix} \quad (17)$$

with $\hat{\eta}_{i,k}$ and $p_{i,k}$ being the normal and point associated with the ith face of the polytope at time k. This implements a zero-padded version of Equation 16 which allows the constraint to ignore the velocity.

The outer polytope boundary 207 and/or the inner polytope boundary 209 may be a close approximation of a sphere, an ROE polytope, a six-sided box an/or a pyramid. A spherical polytope approximation may be done by selecting points from a spherical surface such as in FIG. 3A and using the points for the vertices of the polytope. The convex hull formed by these points is then found and each face is used as a polytope face. At each simulation step, the polytope boundary 207/209 is formed by adding the points $p_{i,k}$ to each position along the desired trajectory of the spacecraft 101. Additional outer polytope boundaries 207 are shown in FIGS. 3E and 3H.

The embodiments implement the MPC 219 to calculate the optimal control sequence for the case when the spacecraft 101 exits a polytope boundary 207/209. As used herein, exits refers to reaches, exits, and/or will exit polytope boundary 207/209 within a specified time interval. The embodiments may implement $L_1$, $L_2$, and/or $L_\infty$ norm objective functions 213 with the goal of comparing the fuel savings.

If it is desired that the spacecraft state x 203, tracks a desired trajectory, $x_d$, then the error state $x_e = x - x_d$ is driven to zero, and the objective function 213 may be updated to account for this. In one embodiment, the desired trajectory is the desired relative state 203 of each spacecraft 101 and is initialized using ROE and converted to the LVLH frame. The desired spacecraft state 203 for each spacecraft 101 is updated using the HCW equations.

Using the desired state, the $L_2$ objective function 213b can be written as Equation 18.

$$J(x, u) = \qquad (18)$$
$$\frac{1}{2}u_0^T R u_0 + \frac{1}{2}\Sigma_{k=1}^{N-1}\left[x_{e,k}^T Q x_{e,k} - 2x_{d,k}^T Q x_{e,k} + u_k^T R u_k\right] + \frac{1}{2}x_{e,N}^T P x_{e,N}.$$

The optimization problem with the polytope constraint can be written as Equation 19.

$$\min_{x,u} \frac{1}{2}u_0^T R u_0 + \frac{1}{2}\Sigma_{k=1}^{N-1}\left[x_k^T Q x_{e,k} - 2x_{d,k}^T Q x_{e,k} + u_k^T R u_k\right] + \qquad (19)$$
$$\frac{1}{2}\left(x_{e,N}^T P x_{e,N} - 2x_{d,N}^T P x_{e,N}\right)$$

s. t. $x_k + 1 = A_D x_k + B_D u_k \quad k = 0, 1, , N - 1$ $A_{poly,k} x_k \leq b_{poly,k} \quad k = 1, 2, , N$ $u_k \leq 1 u_{max} \quad k = 0, 1, 2, , N - 1$ $u_k \geq -1 u_{max} \quad k = 0, 1, 2, , N - 1$ The constraints ensure the dynamics are followed, keep the spacecraft 101 within the outer polytope boundary 207 and/or inner polytope boundary 209, and limit the maximum and minimum control accelerations.

The $L_1$ objective function 213a with $x_e$ may be Equation 20.

$$J_1 = \Sigma_{k=1}^{N-1}|Qx_{e,k}|_1 + \Sigma_{k=0}^{N-1}|Ru_k|_1 + |Px_{e,N}|_1. \qquad (20)$$

The full optimization formulation with the polytope constraint for the $L_1$ objective function 213b may then given by Equation 21.

$$\min_{x,u} \Sigma_{k=1}^{N-1}|Qx_{e,k}|_1 + \Sigma_{k=0}^{N-1}|Ru_k|_1 + |Px_{e,N}|_1 \qquad (21)$$

s. t. $x_{k+1} = A_D x_k + B_d u_k \quad k = 0, 1, , N-1$ $A_{poly,k} x_k \leq b_{poly,k} \quad k = 1, 2, , N$ $u_k \leq 1 u_{max} \quad k = 0, 1, 2, , N - 1$ $u_k \geq -1 u_{max} \quad k = 0, 1, 2, , N - 1$ The $L_\infty$ norm objective function 213c with $x_e$ may be written as Equation 22.

$$J_\infty = \Sigma_{k=1}^{N-1}|Qx_{e,k}|_\infty + \Sigma_{k=0}^{N-1}|Ru_k|_\infty + |Px_{e,N}|_\infty. \qquad (22)$$

The full optimization formulation with the polytope constraint for the $L_\infty$ objective function norm 213c is then Equation 23.

$$\min_{x,u} \Sigma_{k=1}^{N-1}|Qx_{e,k}|_\infty + \Sigma_{k=0}^{N-1}|Ru_k|_\infty + |Px_{e,N}|_\infty \qquad (23)$$

s. t. $x_{k+1} = A_D x_k + B_d u_k \quad k = 0, 1, , N-1$ $A_{poly,k} x_k \leq b_{poly,k} \quad k = 1, 2, , N$ $u_k \leq 1 u_{max} \quad k = 0, 1, 2, , N - 1$ $u_k \geq -1 u_{max} \quad k = 0, 1, 2, , N - 1$ The maneuver strategy 215 is described in FIGS. 3B-C. The switching strategy 223 and drift horizon 225 are described in FIG. 3D. The ROE data is descripted in FIG. 2D.

FIG. 2D is a schematic block diagram illustrating one embodiment of ROE data 227. In the depicted embodiment, the ROE data 227 includes ROE maximum bounds 229, ROE minimum bounds 231, at least one ROE state 233, at least one corresponding LVLH state 235, a ROE space 237, and a LVLH space 239. The ROE state $\alpha_i$ 233 includes a plurality of ROE elements $\delta\alpha$, $\delta\lambda$, $\delta e_x$, $\delta e_y$, $\delta i_x$, $\delta i_y$. The ROE space 237 and/or LVLH space 239 may be defined by an outer polytope boundary 207 and/or an inner polytope boundary 209 including an ROE-base polytope as will be described hereafter in FIG. 3E.

Figure 3A:
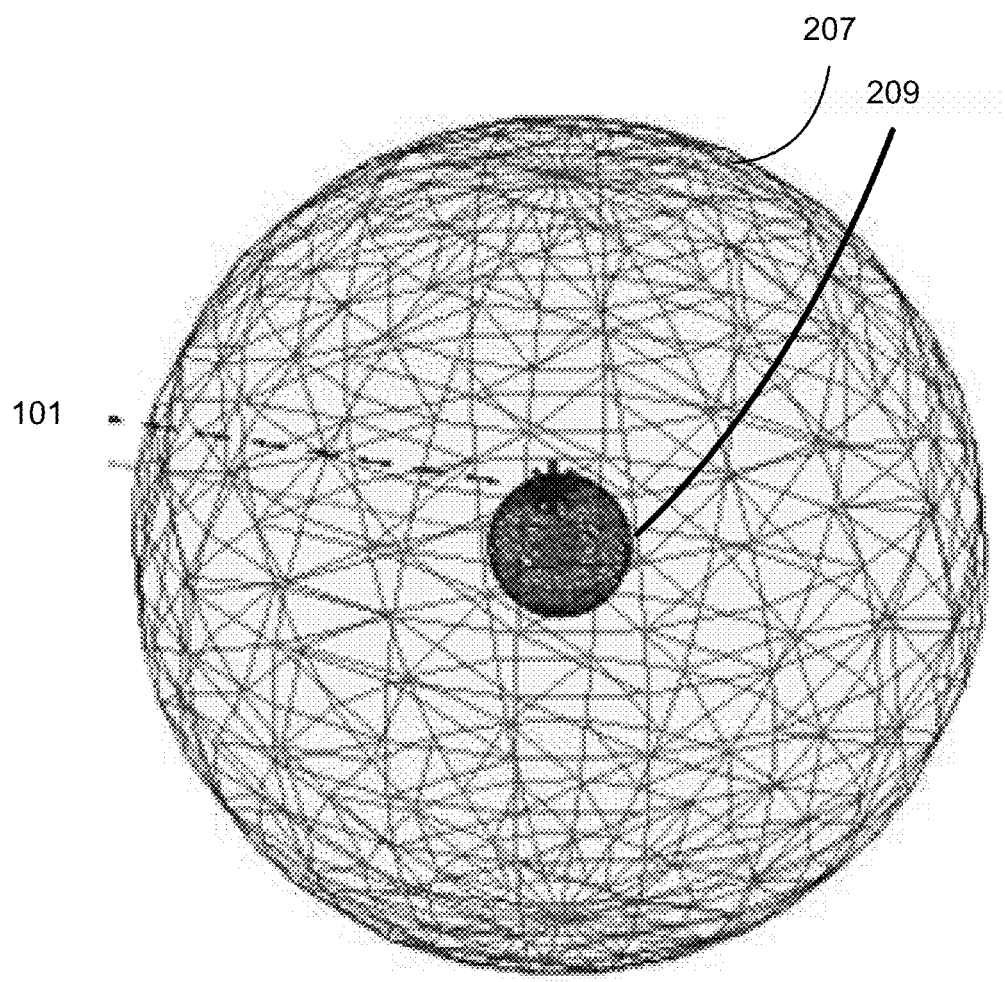
FIG. 3A is a drawing illustrating one embodiment of outer and inner polytope boundaries.

FIG. 3A is a drawing illustrating one embodiment of the outer polytope boundary 207 and the inner polytope boundaries 209. The outer polytope boundary 207 and the inner polytope boundaries 209 are employed to maintain a position of a spacecraft 101 relative to the virtual point 111. By individually maintaining the position of each spacecraft 101 relative to the virtual point 111, the positions of all spacecraft 101 within the spacecraft formation 109 are maintained. In one embodiment, no outer polytope boundaries 207 of the plurality of spacecraft 101 overlap.

In the depicted embodiment, the polytopes 207/209 are sphere-based polytopes. For the sphere-based polytope, a number of points are selected on the surface of a sphere with a radius of a specified length. The points chosen are those which result from the crossing of evenly dispersed lines of latitude and longitude.

Figure 3B:
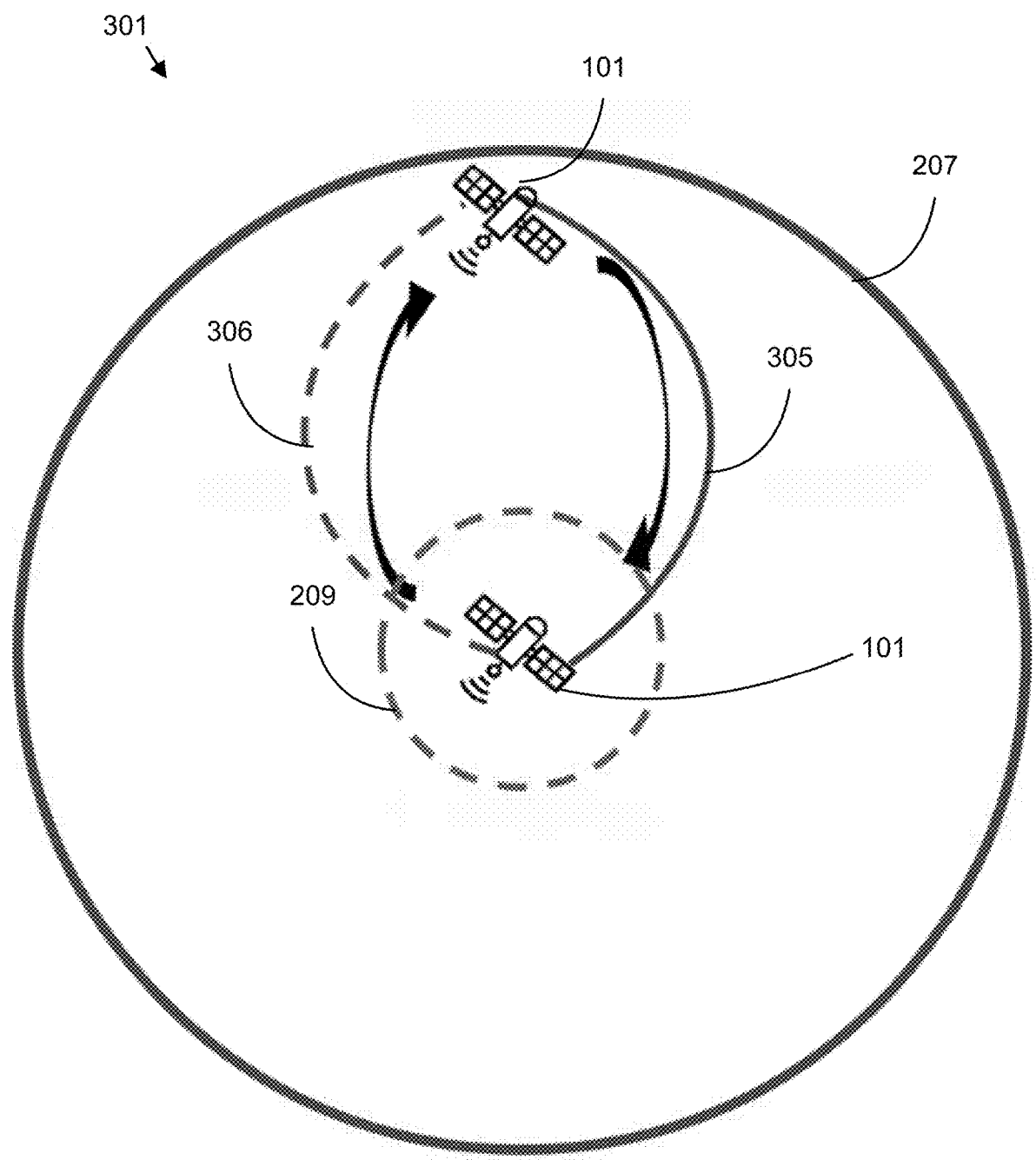
FIG. 3B is a drawing illustrating one embodiment of a large maneuver strategy.

FIG. 3B is a drawing illustrating one embodiment of a large maneuver strategy 301 maneuver strategy 215. As shown, a spacecraft 101 has drifted 306 outside of the inner polytope boundary 209 and may exit the outer polytope boundary 207. In the depicted maneuver strategy 215, fewer maneuvers 305 are used to control a spacecraft 101 to within and/or to the center of the outer polytope boundary 207 and/or inner polytope boundary 209. The large maneuver strategy 301 may comprise no more than a maneuver threshold of maneuvers 305 to move the spacecraft 101 within the outer polytope boundary 207 and/or inner polytope boundary 209. The maneuver threshold may be in the range of 2 to 20 maneuvers 305.

Figure 3C:
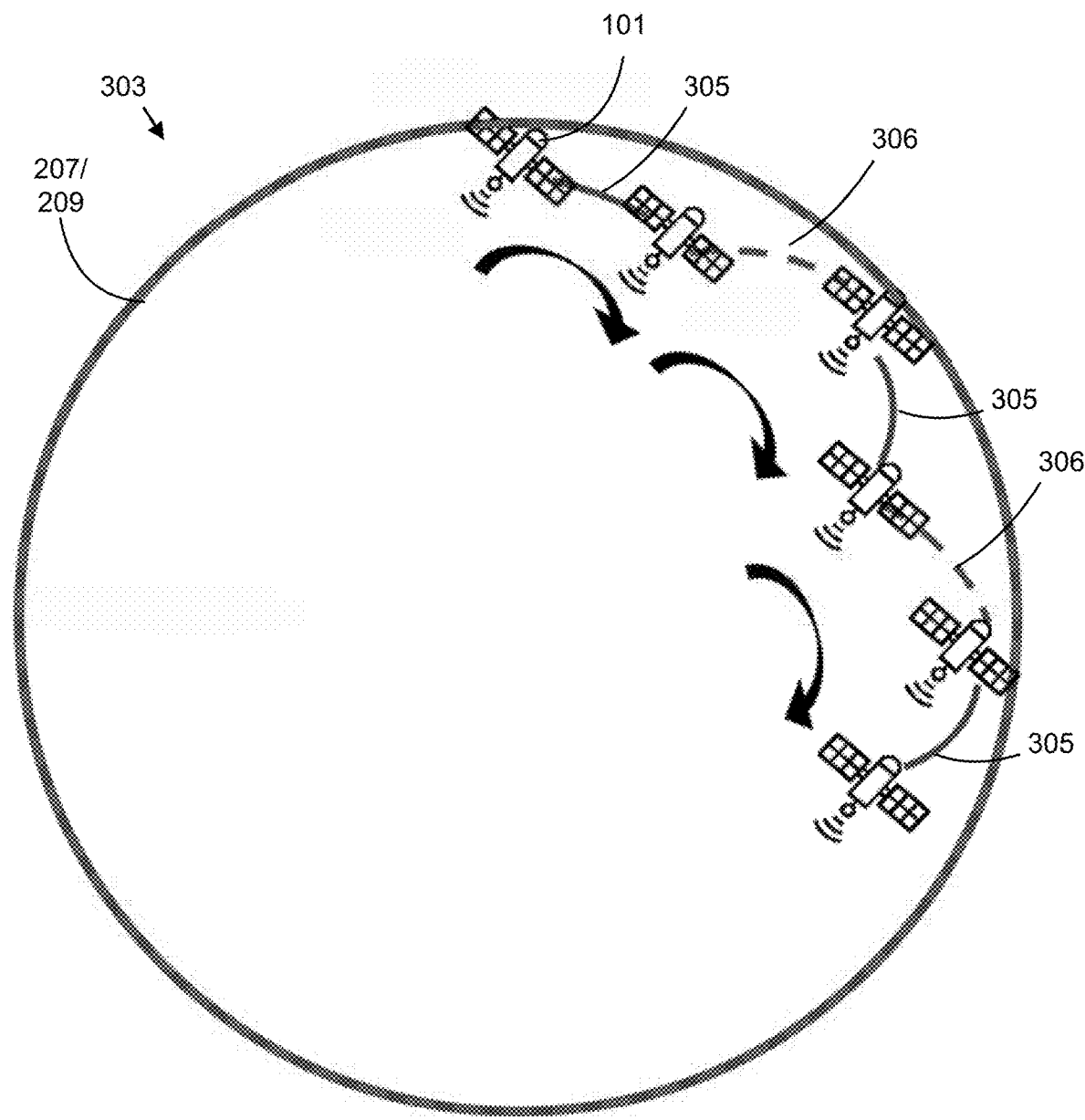
FIG. 3C is a drawing illustrating one embodiment of a small maneuver strategy.

FIG. 3C is a drawing illustrating one embodiment of a small maneuver strategy 303 maneuver strategy 215. The spacecraft 101 is shown drifting 306 to exit the outer polytope boundary 207. In the depicted embodiment, the outer polytope boundary 207 and the inner polytope boundary 209 have a same radius. For the small maneuver strategy 303 maneuver strategy 215, more maneuvers 305 are used to control a spacecraft 101 within the outer polytope boundary 207 and/or inner polytope boundary 209. The small maneuver strategy 303 may comprise at least the maneuver threshold of maneuvers 305 to move the spacecraft 101 within the inner polytope boundary 209.

The embodiments may employ the large maneuver strategy 301 and the small maneuver strategy 303 to minimize fuel usage. The large maneuver strategy 301 periodically uses large maneuvers 305 to drive the position and velocity error to near zero. The small maneuver strategy 303 uses many small maneuvers 305 to stay just inside the boundary of the outer polytope boundary 207 and/or inner polytope boundary 209.

Figure 3D:
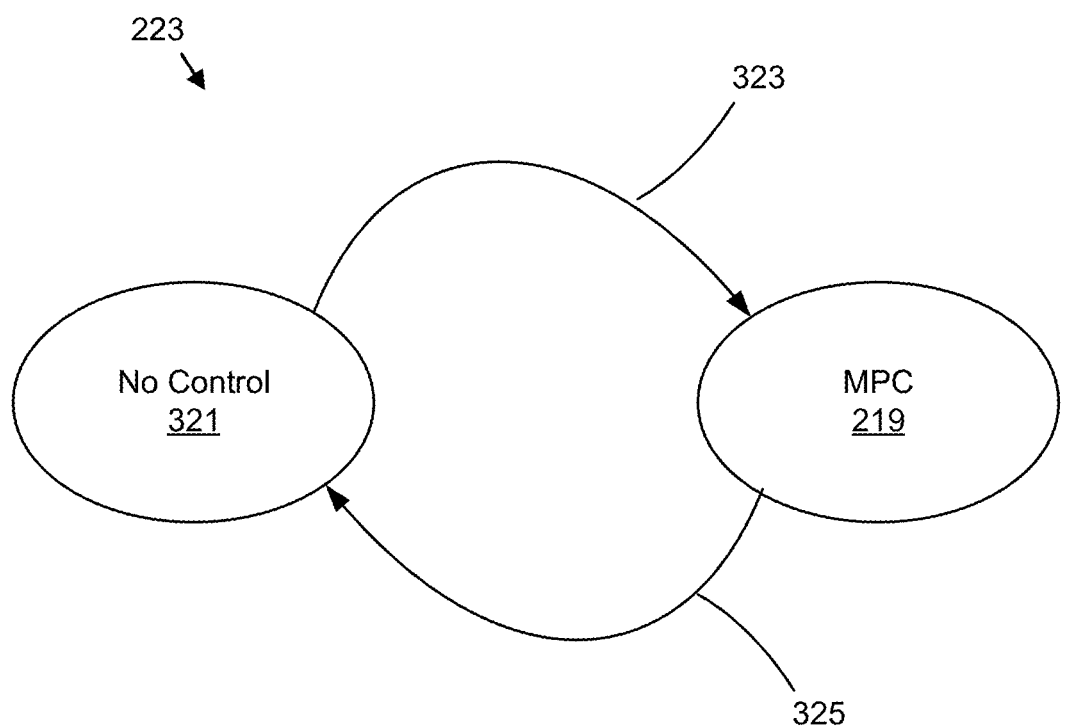
FIG. 3D is a drawing illustrating one embodiment of a switching strategy.
Figure 3E:
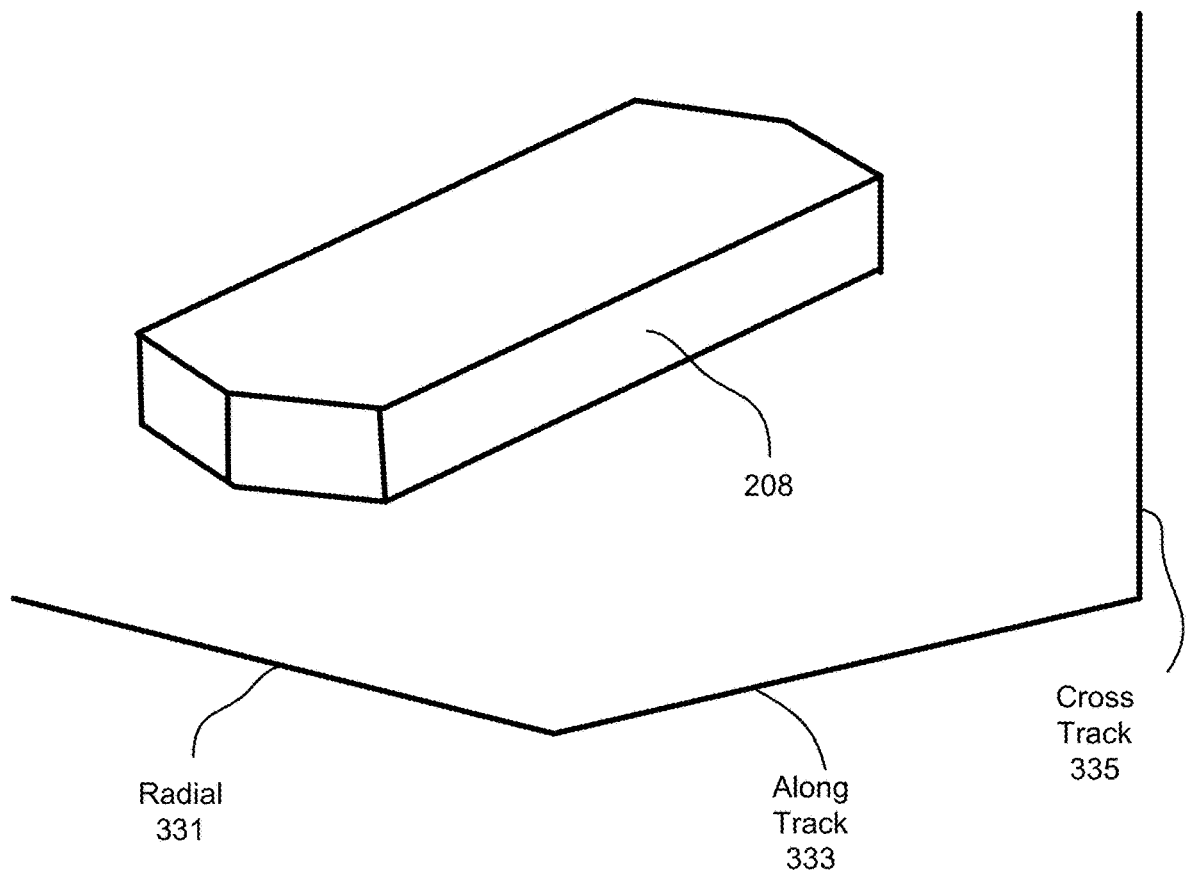
FIG. 3E is a drawing illustrating one embodiment of a ROE-based polytope.

FIG. 3D is a drawing illustrating one embodiment of the switching strategy 223. The switching strategy 223 may determine when to employ the MPC 219 to allow the spacecraft 101 to coast or drift. The switching conditions 323/325 may be the outer polytope boundary 207. The outer polytope boundary 207 may be a keep-in-boundary. In one embodiment, if a maneuver switching condiction 323 determines that the spacecraft 101 will leave the keep-in-boundary then the MPC 219 is activated. If a drift switching condition 325 determines that the spacecraft 101 will remain within the keep-in-boundary, the MPC 219 is deactivated and no control 321 is employed.

In the embodiment of FIG. 3C, the inner polytope boundary 209 is set to have the same radius as the outer polytope boundary 207. This causes the MPC 219 to only be on long enough to keep the spacecraft 101 just inside the outer polytope boundary 207. The outer polytope boundary 207 and the inner polytope boundary 209 are depicted in FIGS. 3A-C.

The inner polytope boundary 209 may be used in the design of the weighting matrix Q. This may encourage the spacecraft 101 to stay in the inner polytope boundary 209. The weighting matrices Q and R may be chosen using Equations 24 and 25.

$$Q_{ij} = \begin{cases} \frac{1}{z_{i,max}^2} & i = j \\ 0 & i \neq j \end{cases} \quad i, j \in 1, \ldots, \ell \tag{24}$$

$$R_{ij} = \begin{cases} \frac{1}{u_{i,max}^2} & i = j \\ 0 & i \neq j \end{cases} \quad i, j \in 1, \ldots, k \tag{25}$$

where $z_{i,max}$ is the maximum desired deviation for the $i^{th}$ state element and $u_{i,max}$ is the maximum desired control for the $i^{th}$ control element. This effectively normalizes or non-dimensionalizes the optimization problem so that the states and controls are equally balanced. The choice of Q and R guide, but do not constrain, the evolution of the state error and control usage and without other constraints there is no guarantee that the $z_{i,max}$ and $u_{i,max}$ values will not be exceeded.

Given Q, and R, the terminal cost, P, of the system can be designed to ensure asymptotic stability of the MPC 219. To guarantee stability, the terminal cost is chosen to represent the cost-to-go of the unconstrained infinite horizon problem for the $L_2$ norm. The Discrete-time Algebraic Riccati Equation (DARE) can be used to find the cost-to-go, $X^T P_\infty X$, or the unconstrained infinite horizon problem. The DARE is represented as shown in Equation 26.

$$0 = A'P_\infty A - P_\infty + Q - A'P_\infty B(B'P_\infty B + R)^{-1}B'P_\infty A. \tag{26}$$

The $P_\infty$ found solving the DARE is then used as the matrix in the terminal cost, P, in the objective function, Equation 15. This guarantees asymptotic stability of the system for the $L_2$ norm objective function 213. In one embodiment A and B may be completely controllable, which is true for the HCW system. R may be be positive definite, and Q may be positive semi-definite and completely observable.

To determine if the spacecraft 101 will exit the outer polytope boundary 207, the drift horizon $N_{drift}$ 225 may be used. The spacecraft state x 203 is propagated using the discrete form of the HCW equations orbital data 221 as Equation 27.

$$\hat{x}_{k+1} = A_D \hat{x}_k \; k = 0,, N_{drift} - 1 \tag{27}$$

where $x_0$ is the current state 203 of the spacecraft 101 and $\hat{x}_k$ are the projected spacecraft states 203 of the spacecraft 101 while drifting. Since this propagation is used to determine the behavior of the spacecraft 101 once the controls are turned off, no control inputs are used.

At each timestep along the drift horizon 225, the outer polytope boundary 207 centered on the desired trajectory at that time is determined. Assuming that $\hat{p}_i$ is the ith point of the outer polytope boundary 207 and is defined with axes identical to the LVLH frame but centered on the desired position of the spacecraft 101, then $p_{i,k}$ is calculated using Equation 28.

$$p_{i,k} = \hat{p}_i x_{d,k} \; \forall i \in M, \; k = 0,, N_{drift} \tag{28}$$

where M is the number of points used to define the polytope boundary 207/209, $x_{d,k}$ is the $k^{th}$ state along the desired orbital path 107, and $p_{i,k}$ is used to define the polytope inequalities.

The drift states $\hat{x}$ 241 may be compared against the polytope using Equation 29, which is identical in form to how the polytope volume is used in the MPC 219 but the time horizon $N_{drift}$ may not be identical to the MPC horizon $N_{MPC}$.

$$A_{poly,k} \hat{x}_k \leq b_{poly,k} \; k = 0,1,, N_{drift} \tag{29}$$

If Equation 29 holds for all k along the drift horizon 225, then the spacecraft 101 is projected to remain inside the outer polytope boundary 207 and the control is not needed. However, if there is any k where the equation does not hold, then the spacecraft 101 is projected to drift out of the outer polytope boundary 207. The MPC 219 then turns on and maneuvers the spacecraft 101. Once the MPC 219 turns on, the spacecraft 101 continues to recalculate and implement controls each timestep until the drift switching condition 325 is met.

The inner polytope boundary 209 may be used to determine if a drift switching condition 325 is satisfied, turning MPC 219 off. The inner polytope boundary 209 may also defined in the LVLH frame centered on the desired orbital path 107 and is translated as shown in Equation 30.

$$p'_{i,k} = \hat{p}'_i + x_{d,k} \; \forall i \in M', \; k = 0,, N_{drift} \tag{30}$$

where the prime indicates that the point is on the inner polytope boundary 209. The drift states 241 are then checked against the inner polytope and if Equation 30 holds true over the entire drift horizon 225, the positional requirement of the spacecraft 101 is considered to be met. The inner polytope boundary radius may also be used to set the Q weight on desired position deviation as shown in Equation 31.

$$A'_{poly,k} \hat{x}_k \leq b'_{poly,k} \; k = 0,1,, N_{drift} \tag{31}$$

In one embodiment, a velocity check is also implemented that compares the velocity of the spacecraft 101 at each point along the drift trajectory with the desired orbital track 107. The cutoff condition is defined using Equation 32.

$$|v - v_d|_2 \leq \delta v \tag{32}$$

where v is the current velocity, $v_d$ is the desired velocity, and δv is the allowable velocity error. The MPC 219 turns off if both the inner polytope boundary 209 and the velocity condition are met. The purpose of the velocity switching condition is to guide the spacecraft 101 to better match the desired orbital track 107 without having to drastically tighten the inner polytope boundary 209.

FIG. 3E is a drawing of an ROE-based polytope 208. The outer polytope boundary 207 may be an ROE-based polytope 208. In addition, the inner polytope boundary 209 and/or drift horizon 225 may also be an ROE-based polytope 208. The ROE-based polytope 208 is shown along a radial axis 331, an along orbital track axis 333, and a cross orbital track axis 335. The ROE-based polytope 208 may change in shape over time.

Given an initial LVLH state $x_i$ of a spacecraft 101, the ROE-based polytope 208 is defined in the following manner. Using the virtual point's 111 state as a reference, the LVLH state is converted to an ROE representation $\delta\alpha_i$. Each ROE element is bounded by some $\sigma \in \{\sigma_-, \sigma_+\}$ which represents the allowable positive and negative deviations from the nominal spacecraft state 203. Every combination of maximum ROE bounds 229 and minimum ROE bounds 231 for each ROE element is shown in Equation 33.

$$\sigma_i \in \begin{Bmatrix} \sigma_{\delta a,-}, \sigma_{\delta a,max} \\ \sigma_{\delta\lambda,-}, \sigma_{\delta\lambda,+} \\ \sigma_{\delta e_x,-}, \sigma_{\delta e_x,+} \\ \sigma_{\delta e_y,-}, \sigma_{\delta e_y,+} \\ \sigma_{\delta i_x,-}, \sigma_{\delta i_x,+} \\ \sigma_{\delta i_y,-}, \sigma_{\delta i_y,+} \end{Bmatrix} \quad (33)$$

The maximum and minimum bounds are added to the nominal ROE state 233 of Equation 34.

$$\delta\alpha_i = \begin{bmatrix} \delta a \\ \delta\lambda \\ \delta e_x \\ \delta e_y \\ \delta i_x \\ \delta i_y \end{bmatrix} + \sigma_i \quad (34)$$

This results in 64 different ROE states 233 that represent the allowable bounds in ROE space 237. Each of these are then converted to Cartesian coordinates in the LVLH frame, again using the virtual point 111 as a reference, generating a cloud of states centered on the nominal ROE state 233. The convex hull of the positions of all the points is then found and used as the ROE polytope 208. The conversion of the constraints from ROE space 237 to LVLH space 239 may cause minor deviations in the constraints.

When multiple ROE-based polytopes 208 are desired along an orbital track 107, the point cloud is found in LVLH space 239. Then, instead of dropping the velocity terms, each point is propagated forward the desired number of steps, using HCW equations. At each point along the orbital track 107, there is now a cloud of points that can be converted to ROE-based polytopes 208 by the preceding method where the convex hull of positions is found. The ROE polytope 208 also could be computed by propagating the ROEs and then converting to LVLH states 235. This would also require propagating reference ROE states 233 which are needed for the conversion. By propagating the ROE-based polytope 208 in LVLH space, only one set of ROE states 233 needs to be propagated and no additional conversions are required.

The outer polytope boundary 207, regardless of shape, only constrains a spacecraft's position in the LVLH space 239. However, when the spacecraft's trajectory is compared against a series of ROE-based polytopes 208, there is an implicit constraint on the velocity since the spacecraft 101 cannot move in such a way that it would breach the position constraints in the future. While each ROE state 233 corresponds to a full LVLH state 235 with position and velocity, the velocity portions are ignored when developing the ROE-based polytope 208. The spacecraft position may exist within the ROE-based polytope 208 position constraint, but the spacecraft velocity may mean that original boundaries, defined in the ROE space 237, are being breached. This should only be a transitory event since the sequence of position constraints approximates a velocity bound.

Figure 3F:
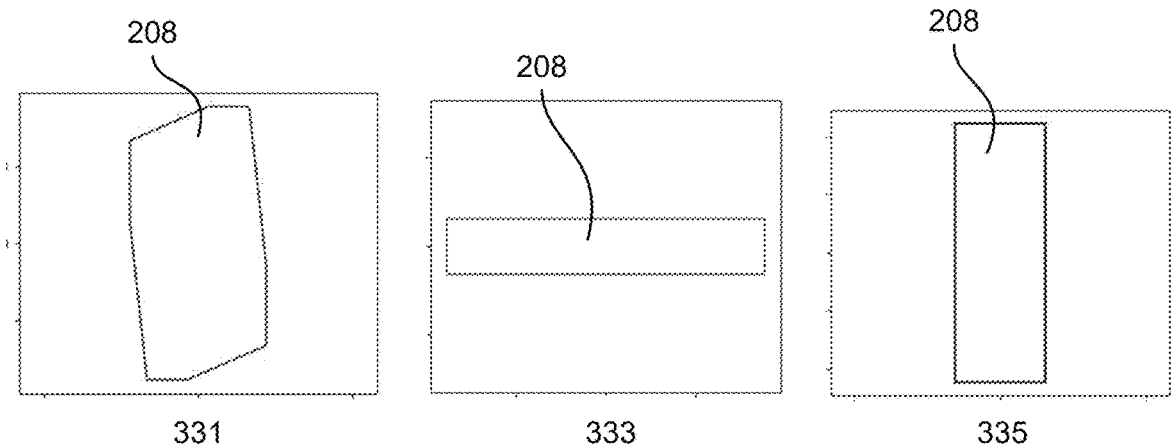
FIG. 3F is graphs of one embodiment of a ROE-based polytope.

FIG. 3F is graphs of one embodiment of an ROE-based polytope 208 in cross sectional area on the radial axis 331, on the along orbital track axis 333, and on the cross-orbital track axis 335. The ROE-based polytope 208 is shown changing shape over time at 0 seconds, 260 seconds, 530 seconds, and 800 seconds.

Figure 3G:
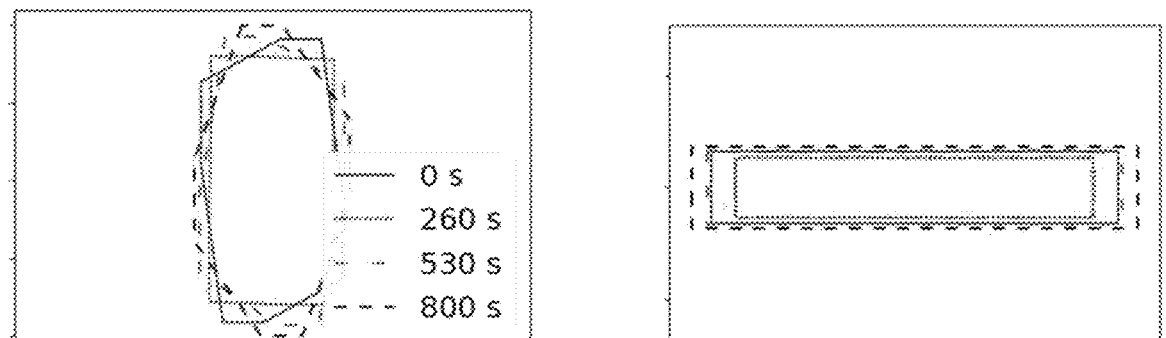
FIG. 3G is graphs of one embodiment of a ROE-based polytope over time.
Figure 3G:
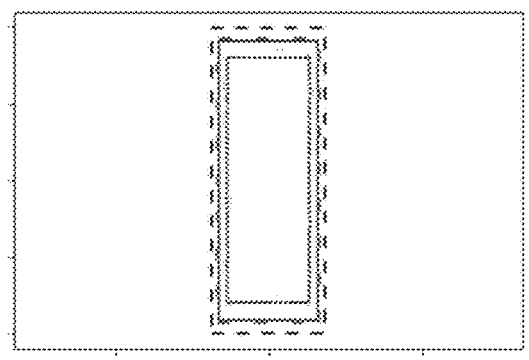
Figure 3H:
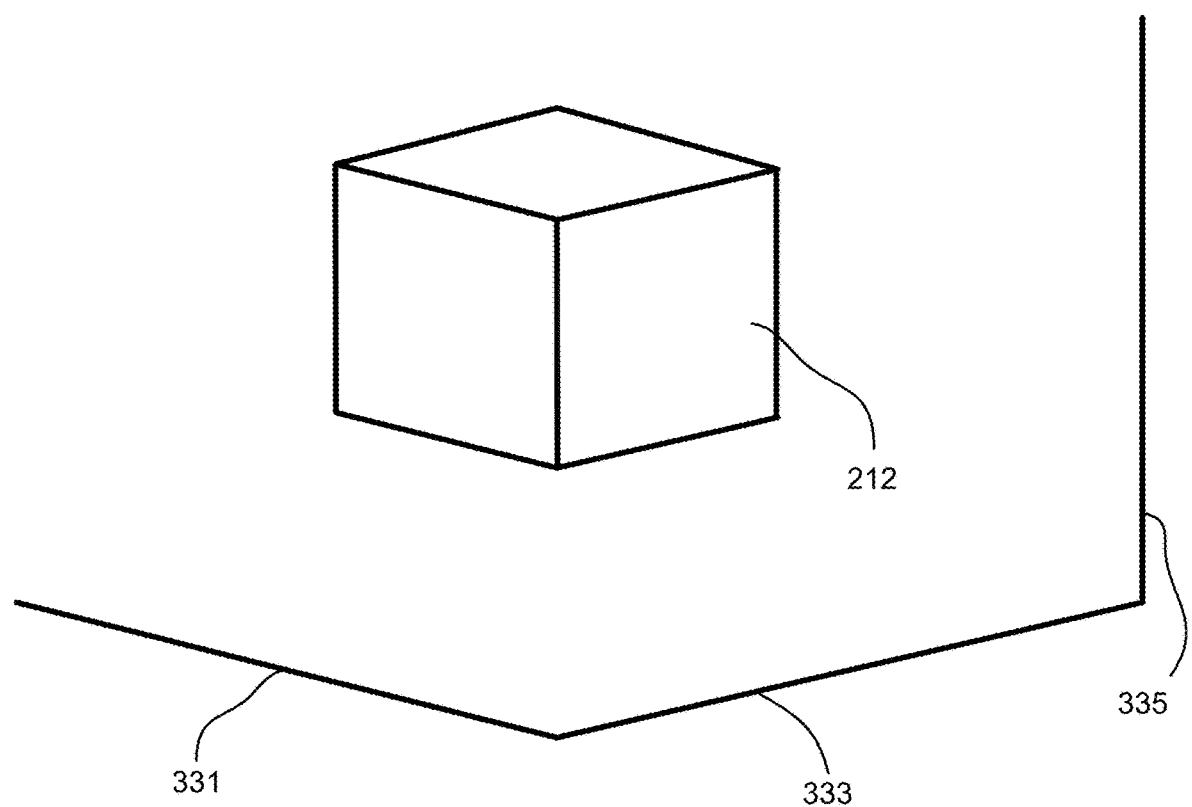
FIG. 3H is a drawing illustrating of one embodiment of a cube-based polytope.

FIG. 3G is graphs of one embodiment of the ROE-based polytope 208 of FIG. 3F over time. In the depicted embodiment, the ROE-based polytope 208 is shown at 0 seconds, 260 seconds, 560 seconds, and 800 seconds. As shown, the ROE-based polytope 208 may change over time as the spacecraft 101 moves along orbital path 107.

FIG. 3H is a drawing illustrating of one embodiment of a cube-based polytope 212. The cube-based polytope 212 is shown along the radial axis 331, the along orbital track axis 333, and the cross-orbital track axis 335.

Figure 4:
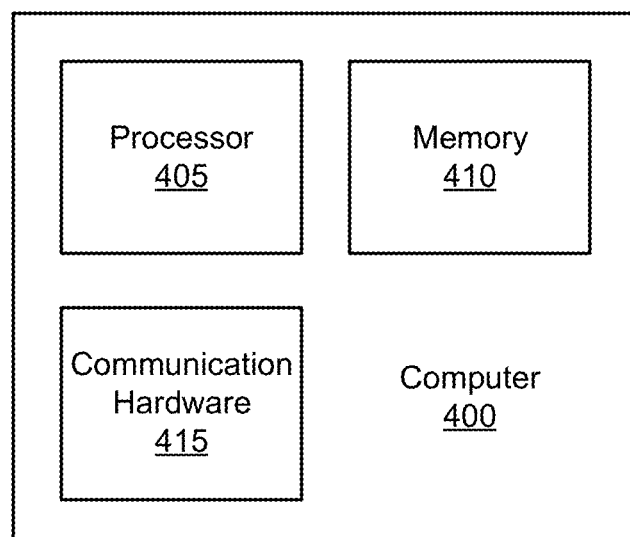
FIG. 4 is a schematic block diagram illustrating one embodiment of a computer.

FIG. 4 is a schematic block diagram illustrating one embodiment of a computer 400. The computer 400 may be embodied in a spacecraft 101 and/or ground station 103. In the depicted embodiment, the computer 400 includes a processor 405, a memory 410, and communication hardware 415. The memory 410 may store code and data. The processor 405 may execute the code and process the data. The communication hardware 415 may communicate with other devices such as spacecraft 101 and ground stations 103.

Figure 5:
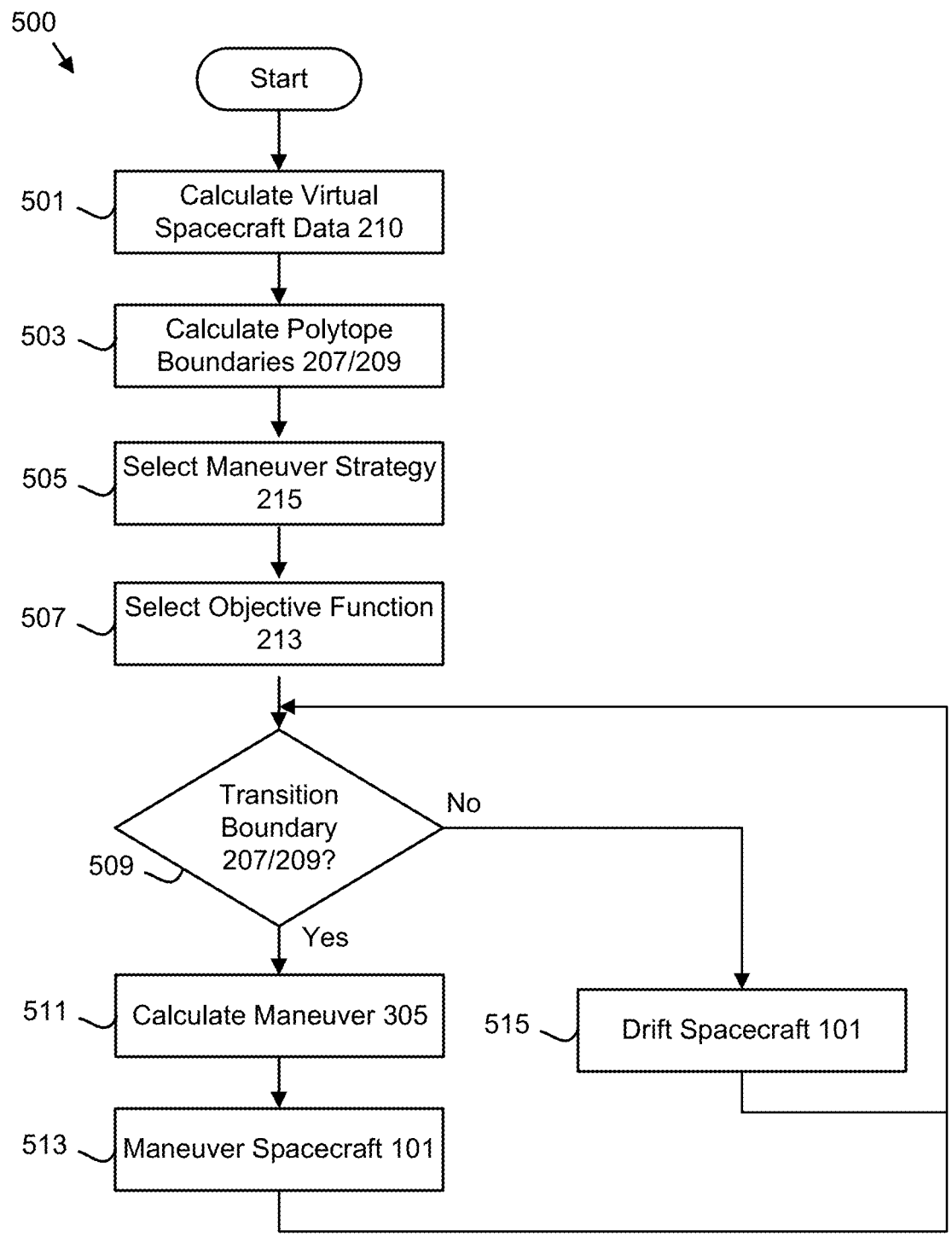
FIG. 5 is a schematic flow chart diagram illustrating one embodiment of a spacecraft control method.

FIG. 5 is a schematic flow chart diagram illustrating one embodiment of a spacecraft control method 500. The method 500 may maneuver the spacecraft 101 within a spacecraft formation 109. The method 500 may be performed by the computer 400 and/or processor 405.

The method 500 starts, and in one embodiment, the processor 405 calculates 501 the virtual spacecraft data 210 for a virtual point 111. The virtual point 111 may represent a plurality of spacecraft 101 orbiting in a spacecraft formation 109.

The processor 405 may calculate 503 the outer polytope boundary 207 and the inner polytope boundary 209 relative to the virtual point 111 for a given spacecraft 101. In addition, the processor 405 may calculate 503 the drift horizon 225. The outer polytope boundary 207 and the inner polytope boundary 209 may have a common center. The outer polytope boundary 207 and the inner polytope boundary 209 may be calculated 503 to maintain the distance threshold 205 between the given spacecraft 101 and the virtual point 111. The outer polytope boundary 207 and the inner polytope boundary 209 may be calculated 503 to maintain a vector of the distance threshold 205 between the given spacecraft 101 and the virtual point 111.

The processor 405 may select 505 a maneuver strategy 215. The maneuver strategy 215 may be selected 505 from the group consisting of the large maneuver strategy 301 and the small maneuver strategy 303. The maneuver strategy 215 may be selected based on forecast maneuvers 305.

The processor 405 may select 507 an objective function 213. The selected objective function 213 may minimize fuel consumption. In one embodiment, the selected objective function 213 minimizes velocity change 217. In one embodiment, the $L_2$ objective function 213 is used.

The processor 405 determines 509 whether the given spacecraft 101 will exit the outer polytope boundary 207. The processor 405 may determine 509 the given spacecraft 101 will exit the outer polytope boundary 207 based on the drift horizon 225. In one embodiment, the given spacecraft 101 is determined 507 to exit the outer polytope boundary 207 if the given spacecraft will exit the outer polytope boundary 207 within a specified time interval such as 5 to 60 minutes. In a certain embodiment, the given spacecraft 101 is determined 507 to enter the inner polytope boundary 209 if the given spacecraft will enter the inner polytope boundary 209 within the specified time interval.

If the processor 405 determines 509 that the given spacecraft 101 will not exit the outer polytope boundary 207, the processor 405 allows the given spacecraft 101 to drift 515. The processor 405 may drift 515 the spacecraft 101 by taking no action. The processor 405 will further loop to determine 509 whether the given spacecraft 101 will exit the outer polytope boundary 207.

If the processor 405 determines 509 that the given spacecraft 101 will exit the outer polytope boundary 207, the processor 405 may calculate 511 a maneuver 305 for the given spacecraft 101 using the MPC 219. The calculation 511 may be relative to the virtual point 111. The calculation 511 of the maneuver 305 for each spacecraft 101 of the spacecraft formation 109 may be performed independently.

The processor 405 further maneuvers 513 the given spacecraft 101 to within the inner polytope boundary 209 using the MPC 219 and the method 500 ends. The given spacecraft 101 may be maneuvered 513 using the selected maneuver strategy 215 and/or calculated maneuver 305. The processor 405 may activate thrusters to maneuver 513 the spacecraft 101.

Figure 6A:
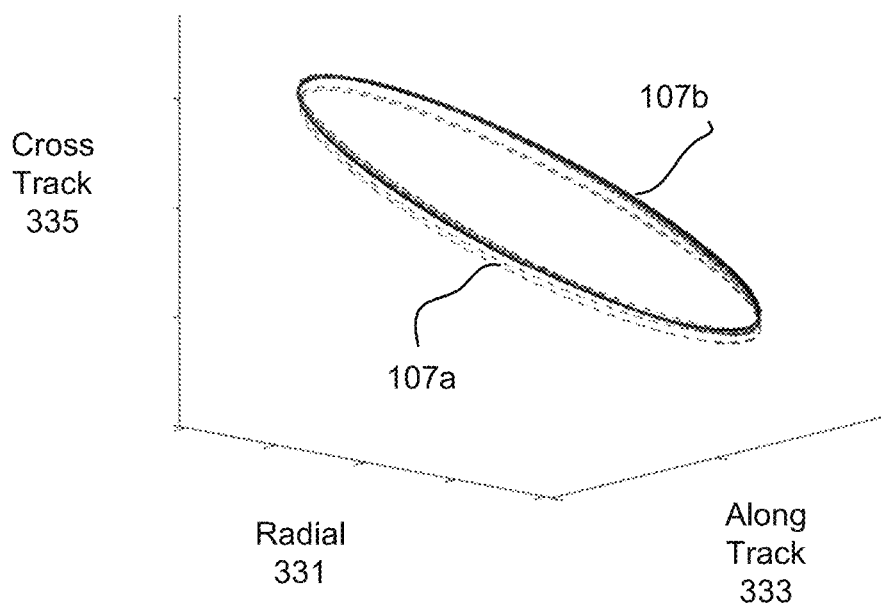
FIG. 6A is a graph illustrating one embodiment of simulated orbital paths.

FIG. 6A is a graph illustrating one embodiment of simulated orbital paths 107. Actual orbital paths (dotted) 107a calculated with an ROE-based polytope 208 using the method 500 of FIG. 5 and a desired orbital path (solid) 107b are shown in an LVLH frame. The actual orbital paths 107a closely approximate the desired orbital path 107b. The simulation is based on the parameters in Table 1.

TABLE 1

| Parameter | Value |
| --- | --- |
| Spacecraft Mass | 24 kilograms (kg) |
| Spacecraft $C_D$ | 2.2 |
| Spacecraft Area to Mass | 0.001 m²/kg |
| Spacecraft Thrust | 0.5 Newtons |
| Simulation Timestep | 10 seconds (s) |
| Simulation Timesteps | 8640 steps |
| MPC Horizon | 60 steps |
| Drift Horizon 225 | 15 steps |

Table 2 defines the reference orbit of the virtual point 111 used in the simulation.

TABLE 2

| Keplerian Orbital Element | Value |
| --- | --- |
| Semi-major Axis | 6878 kilometers (km) |
| Eccentricity | $1 \times 10^{-4}$ |
| Inclination | 25 degrees |
| Right ascension of the ascending node | 45 degrees |
| Argument of Perigee | 0 degrees |
| Initial True Anomaly | 100 degrees |

Table 3 shows the relative orbital elements used for the spacecraft 101 in the simulation.

TABLE 3

| Relative Orbital Element | Value |
| --- | --- |
| $\delta\alpha$ | 0 |
| $\delta\lambda$ | 0 |
| $\delta e_x$ | $3 \times 10^{-3}$ |
| $\delta e_y$ | $3 \times 10^{-4}$ |
| $\delta i_x$ | $3 \times 10^{-4}$ |
| $\delta i_y$ | 0 |

In one embodiment, for each point along the desired orbital path 107, a volume of space is defined using the method described above. The polytope boundary $b_{bound}$ 207/209 constraint may be defined as shown in Equations 35-37.

$$A_{bound}\xi \leq b_{bound} \quad (35)$$

where $$A_{bound} = \begin{bmatrix} A_{poly,1} & 0 & 0 & 0 & 0 \\ 0 & A_{poly,2} & 0 & 0 & 0 \\ \vdots & \vdots & \ddots & \vdots & \ddots & \vdots \\ 0 & 0 & & A_{poly,N} & 0 & 0 \end{bmatrix} \quad (36)$$

$$b_{bound} = \begin{bmatrix} b_{poly,1}^T & b_{poly,2}^T & b_{poly,N}^T \end{bmatrix}^T \quad (37)$$

with $A_{poly,k}$ and $b_{poly,k}$ referring to the polytope boundaries 207/209 corresponding to the kth point along the desired orbital path 107. The $A_{poly,k}$ matrix is padded with zeros to properly match whichever. While each $A_{poly,k}$ has the same number of columns, the number of rows is free to vary as long as each $A_{poly,k}$ matches its corresponding $b_{poly,k}$. This allows the polytope boundary 207/209 at each timestep k to vary with the only requirement being that the polytope is convex. The spherical polytope boundary 207/209 such as shown in FIG. 3A is fixed relative to a spacecraft's desired state but moves as the trajectory moves in the LVLH frame.

Figure 6B:
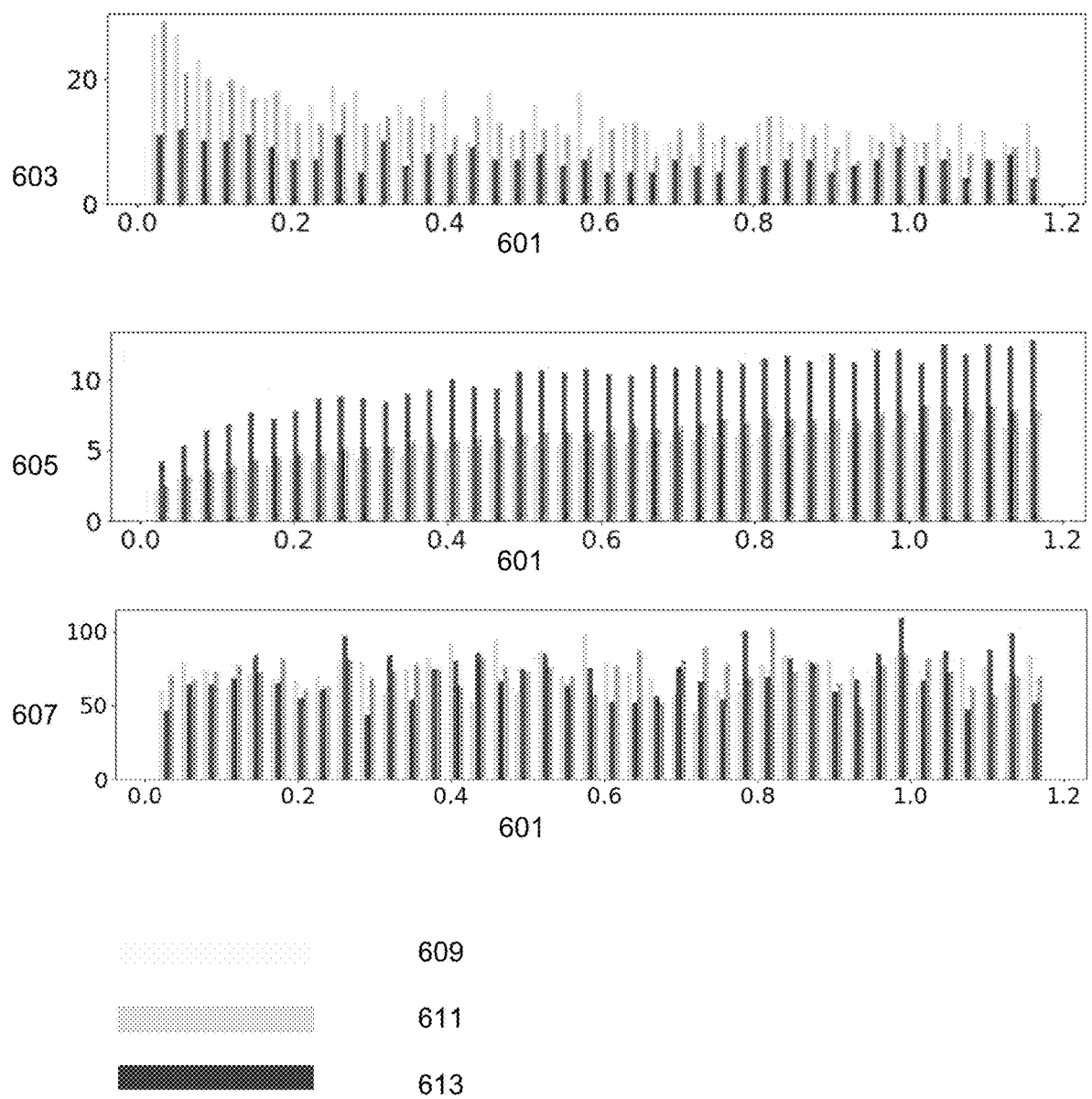
FIG. 6B is graphs showing simulated performance of polytope boundaries.

FIG. 6B is graphs showing simulated performance of polytope boundaries for the simulation of FIG. 6A for a cube polytope 609, a sphere polytope 611, and an ROE-based polytope 613. The number of maneuvers 603, change in velocity (ΔV) 605 in meters (m)/s, and total change in velocity (ΔV$_T$) in m/s are shown for polytope volumes 601 measured in km³. As shown, the ROE-based polytope 208 results in fewer maneuvers, allowing the spacecraft 101 to spend more time on mission objectives. In addition, the ROE-based polytope 208 has smaller allowable derivations in the cross track, allowing for tighter formations than would be possible using the cube-based polytopes 212 or sphere-based polytopes.

The embodiments employ the virtual point 111, the outer polytope boundary 207, and the inner polytope boundary 209 to simplify calculating maneuvers 305 to maintain each spacecraft 101 at a desired position within the spacecraft formation 109. As a result, the efficiency and effectiveness of the computer 400 is improved.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
calculating, by use of a processor, a virtual point that represents a plurality of spacecraft orbiting in a spacecraft formation, wherein the virtual point is offset from each spacecraft in the formation;
iteratively calculating an outer polytope boundary, an inner polytope boundary relative to the virtual point for a given spacecraft of the plurality of spacecraft, wherein the outer polytope boundary and the inner polytope boundary each are defined by points crossing at evenly dispersed lines of latitude and longitude and the inner polytope boundary is within the outer polytope boundary; and
in response to determining the outer polytope boundary will be breached, maneuvering the given spacecraft until to within the inner polytope boundary to using model predictive control (MPC) to minimize fuel consumption.

2. The method of claim 1, wherein the inner polytope boundary determines controller weights for a state error.

3. The method of claim 1, wherein the outer polytope boundary is a Relative Orbital Elements (ROE) based polytope and each face of the outer polytope boundary (larger polytope) is perpendicular to a Local Vertical Local Horizontal (LVLH) axis and is offset from a center of the larger polytope by an allowed deviation.

4. The method of claim 1, the method further comprising drifting the given spacecraft in response to the given spacecraft being within the outer polytope boundary.

5. The method of claim 1, wherein the MPC employs a second objective function $L_2$.

6. The method of claim 1, the method further comprising selecting a maneuver strategy from the group consisting of large maneuver strategy and a small maneuver strategy.

7. The method of claim 6, wherein the large maneuver strategy comprises no more than a maneuver threshold of maneuvers and the small maneuver strategy comprises at least the maneuver threshold of maneuvers.

8. An apparatus comprising:
a processor executing code stored on a memory to perform:
calculating a virtual point that represents a plurality of spacecraft orbiting in a spacecraft formation, wherein the virtual point is offset from each spacecraft in the formation;
iteratively calculating an outer polytope boundary, an inner polytope boundary relative to the virtual point for a given spacecraft of the plurality of spacecraft, wherein the outer polytope boundary and the inner polytope boundary each are defined by points crossing at evenly dispersed lines of latitude and longitude and the inner polytope boundary is within the outer polytope boundary; and
in response to determining the outer polytope boundary will be breached, maneuvering the given spacecraft until to within the inner polytope boundary to using model predictive control (MPC) to minimize fuel consumption.

9. The apparatus of claim 8, wherein the inner polytope boundary determines controller weights for a state error.

10. The apparatus of claim 8, wherein the outer polytope boundary is a Relative Orbital Elements (ROE) based polytope and each face of the outer polytope boundary (larger polytope) is perpendicular to a Local Vertical Local Horizontal (LVLH) axis and is offset from a center of the larger polytope by an allowed deviation.

11. The apparatus of claim 8, the processor further drifting the given spacecraft in response to the given spacecraft being within the outer polytope boundary.

12. The apparatus of claim 8, wherein the MPC employs a second objective function $L_2$.

13. The apparatus of claim 8, the processor further selecting a maneuver strategy from the group consisting of large maneuver strategy and a small maneuver strategy.

14. The apparatus of claim 13, wherein the large maneuver strategy comprises no more than a maneuver threshold of maneuvers and the small maneuver strategy comprises at least the maneuver threshold of maneuvers.

15. A computer program product comprising a non-transitory computer readable storage medium storing code executable by a processor to perform:
calculating a virtual point that represents a plurality of spacecraft orbiting in a spacecraft formation, wherein the virtual point is offset from each spacecraft in the formation;
iteratively calculating an outer polytope boundary, an inner polytope boundary relative to the virtual point for a given spacecraft of the plurality of spacecraft, wherein the outer polytope boundary and the inner polytope boundary each are defined by points crossing at evenly dispersed lines of latitude and longitude and the inner polytope boundary is within the outer polytope boundary; and
in response to determining the outer polytope boundary will be breached, maneuvering the given spacecraft until to within the inner polytope boundary to using model predictive control (MPC) to minimize fuel consumption.

16. The computer program product of claim 15, wherein the inner polytope boundary determines controller weights for a state error.

17. The computer program product of claim 15, wherein the outer polytope boundary is a Relative Orbital Elements (ROE) based polytope and each face of the outer polytope boundary (larger polytope) is perpendicular to a Local Vertical Local Horizontal (LVLH) axis and is offset from a center of the larger polytope by an allowed deviation.

18. The computer program product of claim 15, the processor further drifting the given spacecraft in response to the given spacecraft being within the outer polytope boundary.

19. The computer program product of claim 15, wherein the MPC employs a second objective function $L_2$.

20. The computer program product of claim 15, the processor further selecting a maneuver strategy from the group consisting of large maneuver strategy and a small maneuver strategy.

* * * * *